(No Model.)
C. R. GILLETT & O. S. HELLWIG.
ACETYLENE GAS GENERATOR.
No. 603,506. Patented May 3, 1898.
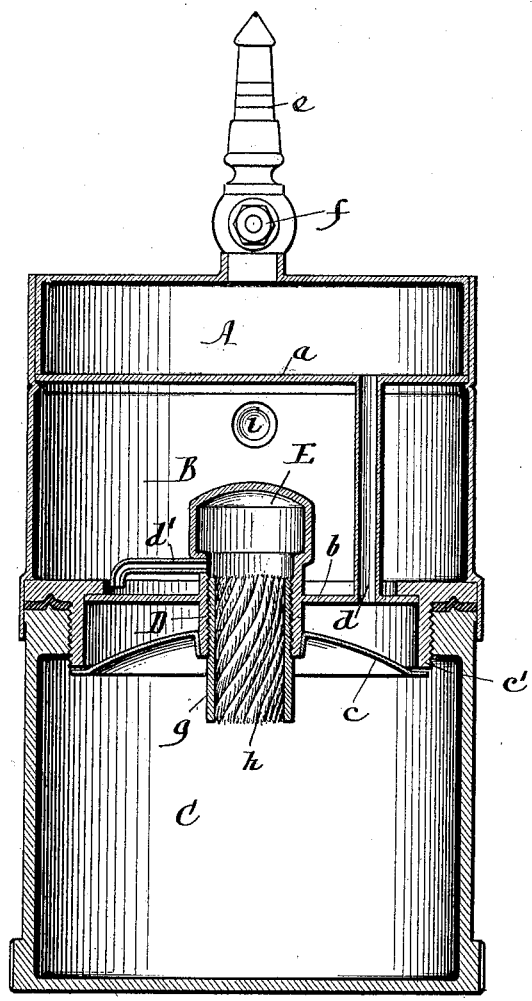
Witnesses:
Inventors:
Clarence R. Gillett
Otto S. Hellwig
By Henry Fisher
Attorneys.

UNITED STATES PATENT OFFICE.

CLARENCE R. GILLETT AND OTTO S. HELLWIG, OF CHICAGO, ILLINOIS; SAID HELLWIG ASSIGNOR TO SAID GILLETT; SAID GILLETT ASSIGNOR TO THE GILLETT GENERATOR COMPANY, OF SAME PLACE.

ACETYLENE-GAS GENERATOR.

SPECIFICATION forming part of Letters Patent No. 603,506, dated May 3, 1898.

Application filed September 13, 1897. Serial No. 651,513. (No model.)

*To all whom it may concern:*

Be it known that we, CLARENCE R. GILLETT and OTTO S. HELLWIG, residents of Chicago, Cook county, Illinois, have invented certain new and useful Improvements in Gas-Generators, of which the following is hereby declared to be a full, clear, and exact description.

The invention is directed to generators employed more especially for the production of free acetylene gas by use of water as the exciting liquid acting in contact with calcic carbid as a basic material; and the object is to provide improved means for automatically regulating the feed-supply of the liquid reagent in keeping with the consumption of gas at the burner or external circuit. The nature of the advance will appear in detail from the description and its scope be defined by claim at the conclusion.

On the drawing the figure is a view in longitudinal central section displaying the device when adapted for use as a bicycle-lamp.

As employed for vehicle-lamps the generator is compactly built, of general cylindric form, and comprises at top a gas-chamber A, separated by partition $a$ from water-tank B, which latter is closed by bottom plate $b$, but is detachably joined, gas-tight, to retort-cup C. The cup is generally made of cast metal and constitutes the receiver for a carbid charge. A disk $c$, sustained just below the bottom $b$, with its outer rim barely clearing the adjacent ring-flange $c'$, acts as a screen to prevent solid particles of material within the retort from clogging the gas-exit tube $d$. Tube $d$ passes through water-tank B and serves to deliver gas from retort C to chamber A, from whence it passes to the burner $e$, controlled by cock $f$.

Between the water-tank and the retort is interposed an obstructive percolator D, designed to regulate the water-feed. The body of the percolator is conveniently of cylindric form, united to bottom plate $b$, and is extended into the tank-chamber. A lateral tubule $d'$ reaches from the percolator and opens into the tank. Above the mouth of the tubule the percolator extends to form a closed receiver E for trapping a minor volume of gas. A pipe-section $g$, united detachably to the lower end of the percolator, constitutes an extension thereof and carries a stuffing $h$, of lamp-wick or like porous material, to obstruct the passage of water.

On filling tank B with water, as through hole $i$, the liquid flows in measure along tubule $d'$ and eventually saturates the stuffing $h$. There is no drip of water into the retort beneath, nor will this ensue unless the pressure over the wad $h$ is higher than that existing at the retort.

If a charge of carbid be filled into the detached retort C and a few drops of water be added, then on restoring the retort to place in the apparatus the slight volume of gas generated by the few drops of liquid will proceed in part through exit-tube $d$ into storage-chamber A in readiness to feed burner $e$ on turning cock $f$. Another portion of the gas will force its way past stuffing $h$ at the percolator and, driving back the water in tube $d'$, will rise through the tank-supply and accumulate over the free surface of the water. Simultaneously the closed trap E of the percolator will fill with gas, which stays confined therein over stuffing $h$ and the mouth of tube $d'$.

By opening cock $f$ at the burner the gas-pressure within the retort becomes less than that existing over the water in tank B. Hence the water begins to feed through tube $d'$ and past the percolator, falling drop by drop onto the carbid in retort C. So long as the pressure at the retort is less than that over the water-tank the feed of water will continue, but will stop when the opposite condition prevails. This shift in condition back and forth is reflected in the pulsatory character of the flame. The flame flares up and then flickers down, and if shut off entirely the pressure at the retort is often too highly developed before the water-feed can be fully arrested. To avoid these defects is the object of closed receiver E, which acts as a governor or cushion-trap at the percolator, and by reason of its confined gas serves to minimize the inequalities of feed and renders the working of the apparatus more steady and uniform. It also becomes quickly sensitive in event the consumption of gas is stopped, and operates to check the further flow of water at tubule $d$, which is then of high moment.

Obviously the details of structure can be varied by the mechanic's skill without departure from the essentials of the foregoing.

Having just described our invention, what we claim as new, and desire to secure by Letters Patent, is—

In gas-generators, the combination with the retort and its controllable outlet, of the separate water-tank, the percolator interposed between said retort and tank discharging at one side of its obstructive wad into the retort and at its opposite communicating with the tank beneath the water-level therein and the closed cushion-trap for gas joined to the percolator on the tank side of its wad and above the water-inflow to the percolator, substantially as described.

CLARENCE R. GILLETT.
OTTO S. HELLWIG.

Witnesses:
PETER P. WOOD,
JAMES H. PEIRCE.